2,794,301
PRODUCTION OF FREE-FLOWING GLASS BEADS

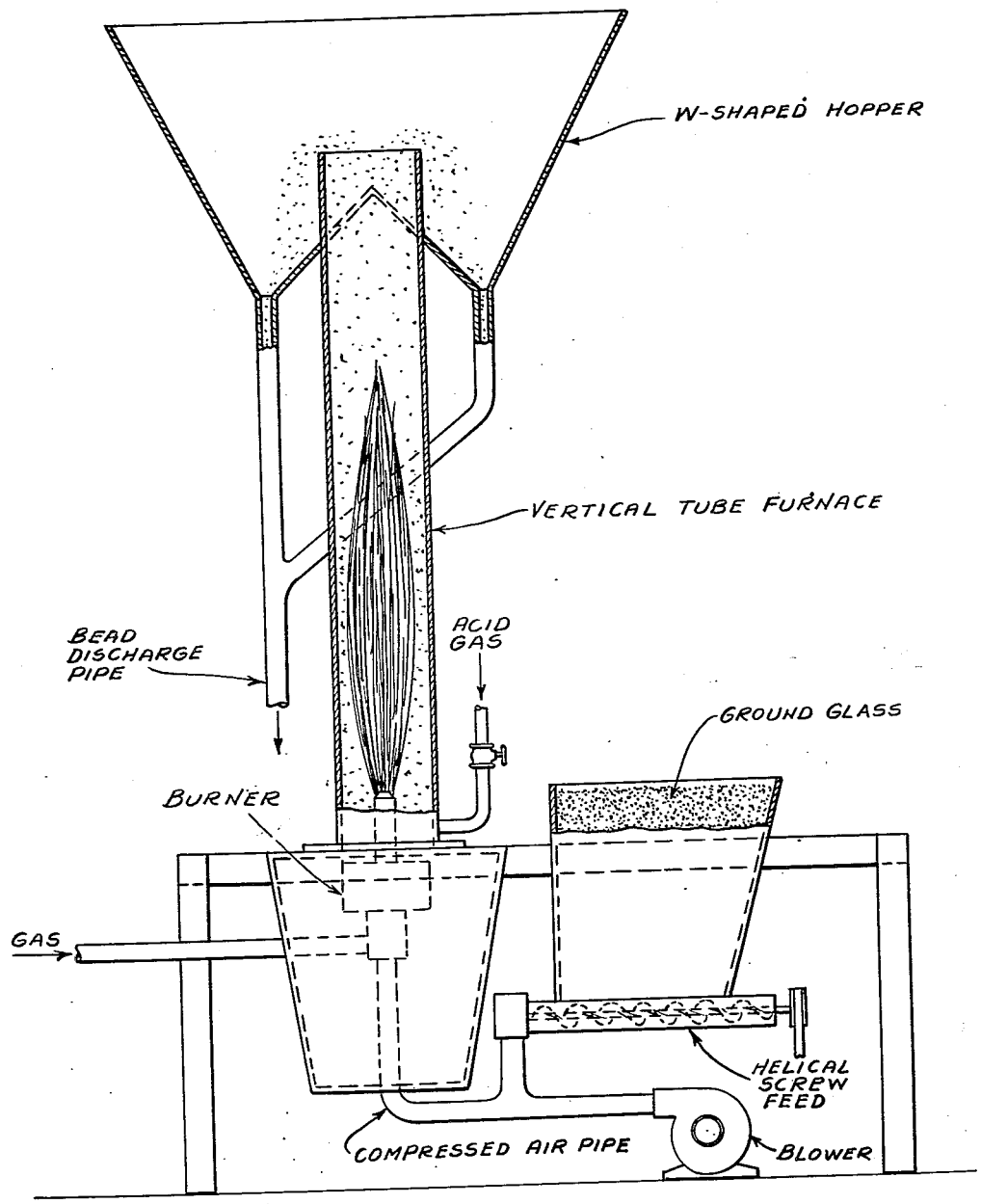

Preston D. Law, Kirkwood, and Vincent L. Duval d'Adrian, Webster Groves, Mo., assignors to Flex-O-Lite Manufacturing Corporation, St. Louis, Mo., a corporation of Missouri Application January 29, 1953, Serial No. 333,892

7 Claims. (Cl. 49—84)

This invention relates to the production of glass beads, and in particular is concerned with the manufacture of spherical glass beads of small particle size which have a free-flowing characteristic when stored together.

Such small glass beads have a variety of uses but are of particular advantage on motion picture screens, and also in paints so as to form a reflective traffic paint. In the conventional production of the glass beads, as has been practiced in the past, it has been found that these spherical beads are covered on their exterior with a layer of alkali and silica where soda lime glass or other glasses having a substantial alkali content are used as the starting material. This layer has many disadvantages due to the fact that the alkali will attack the ingredients of the paint in which it is used as well as form an opaque layer, which minimizes the reflecting power of the spherical beads. In addition, due to the deliquescent nature of the alkali, moisture is taken from the atmosphere when these beads are stored such that a moist layer is formed around the individual beads, which tend to form a slushy agglomerate, and thereby prevent free-flowing of the beads when they are metered out or dispensed through a metering apparatus. To combat this problem in the past it has been found necessary to heat the beads in the dispensing operation to drive off the moisture, which leads to great trouble, expense and complicated equipment. Further, if the beads are allowed to stand for an appreciable length of time, the alkali will combine with the silica to form a hard cohesive binder of sodium silicate similar to the action of water glass which cements together the glass beads into a hard monolithic product. In addition, the free alkali, in combination with moisture taken up from the atmosphere, attacks the glass bead itself so as to etch the bead, destroy the lustre and spherical shape, and weaken the bead structurally so that when these beads are subjected to abrasion or wear they crack and fail.

Minute spherical glass beads can be made in a number of different ways, but most processes are based upon supplying the charged material in more or less finely divided form to and in contact with a hot flame and air which renders the glass particles molten and causes the particles to assume a spherical shape, after which it is cooled and solidified in the form of small spherical beads. To be technically correct it should be explained that glass in its normal state is considered to be an under-cooled liquid rather than a true solid but upon an increase in temperature the viscosity is greatly reduced and the glass is able to flow. For convenience the glass at these higher stages of temperature will be termed molten. Reference is made to Charles C. Bland Patent No. 2,600,963, issued June 17, 1952, which shows an improved process for producing such glass beads, ranging in particle size from 5 to 1,150 microns. In the production of these beads very high temperatures, in the neighborhood of 3,000° F., are encountered, and it is at these temperatures that the outer layer comprising a high percentage of free alkali is formed upon these beads. This is due to the fact that sodium and potassium oxides, which are the conventional alkali metals found in soda lime glass, sublime below these temperatures and form very easily upon the surface when the beads are cooled. In these processes as the glass particles are brought up to maximum temperature it is believed that the alkali is driven off from and within the surface of the particles, leaving an outer region deficient in alkali and high in silica so as to impart hardness thereto. At these high temperatures the internal stresses within the glass are relieved and equalized so that the particles assume a spherical shape. Subsequently, as the temperatures are decreased the sublimed alkali condenses on the spherical bead surfaces in the form of a layer rich in alkali.

By means of this invention, it has been found possible to incorporate in the method for production of these spherical glass beads a modified process which constitutes contacting the glass with strong acidic gases which react with the alkali so as to form an alkali salt which does not absorb moisture. These acidic gases may be charged directly to the glass material as it is in the process of being heated at the high temperatures involved, or certain compounds may be introduced with the glass charge which liberate acidic gases upon being subjected to the high temperatures encountered in the process. In general the acidic gases contemplated are those which form strong acid salts with sodium and includes chlorine, sulphur dioxide, sulphur trioxide, the various oxide gases of nitrogen, as well as the corresponding acids, such as hydrochloric acid, nitric acid and sulphuric acid, which volatilize at the temperatures encountered. The solid compounds which may be introduced in the glass charge include sulphur, ammonium chloride, ammonium sulphate, and ammonium nitrate, and other compounds which liberate the desired acidic gases at the temperatures utilized. By utilizing the process of this invention it is made possible to produce, without the requirement of any additional steps after the production of these glass beads, free-flowing glass beads which are covered with an inert layer and have improved reflecting qualities as well as increased strength over the beads made in the conventional processes previously utilized.

Accordingly, it is a primary object of this invention to obtain glass beads of small particle size which have a free-flowing characteristic under normal atmospheric conditions, and are not subject to agglomeration.

It is a further object of this invention to produce glass beads which have an inert surface and have improved reflective powers and resistance to abrasion.

It is yet another object of this invention to incorporate in a process for producing minute spherical glass beads an acidic gas which renders the glass beads so produced inactive to atmospheric conditions of high humidity such that a free-flowing characterisitc of the beads is obtained.

It is still a further object of this invention to incorporate with the glass charge which is introduced into the spherical bead-making process a substance which liberates an acidic gas at the temperatures encountered in the process.

A further object of this invention is to produce a glass bead which has a free-flowing characteristic in atmospheric conditions of high humidity, an abrasion resistant surface and improved reflectivity.

The process of this invention utilizes any glass having an appreciable alkali content of around 7% or more and in particular soda lime glass which has a silica ($SiO_2$) composition ranging from 60 to 73%, lime (CaO) 8 to 14%, alkali ($Na_2O$ or $K_2O$) 10 to 20%, and aluminum and iron oxides ($Al_2O_3$ and $Fe_2O_3$) 1 to 3%. This is one of the most widely and commercially used glasses and is the type used in plate glass, window glass, bottles, lamp bulbs, etc. When this type of glass is used in the above mentioned process described in Charles Bland Patent No. 2,600,963, it is first finely ground and then charged from a screw-feed hopper with compressed air so as to form a jet of tiny glass particles and air which is introduced into a natural gas furnace, as shown in the accompanying drawing illustrating a typical production layout. It is to be understood that this drawing is for purposes of illustration only and that the process of this invention has broader application than in the apparatus shown. The introduction is effected so that the jet is directed upwardly into a very hot flame in which the temperature is in the neighborhood of 3,000° F. In the course of the hot temperatures encountered the glass particles are softened until they assume a spherical shape and are collected at cooler temperatures in a W-shaped hopper in the form of spherical glass beads of particle size ranging from 5 to 1,150 microns, depending upon the size of the charged particles. At the high temperatures encountered, the glass softens or melts, as described previously, and alkali in the glass, which may be sodium or potassium, is driven off in the form of a vapor. At the high temperature encountered in the furnace the alkali (which can be considered as sodium oxide) actually migrates to the surface of the glass particles and reduces the surface tension to allow the spherical formation of the beads. It has been established that in multi-component systems the surface-free energy can be decreased not only by surface contraction but also by rearrangement of the molecules as by the migration of the constituent with the lowest surface tension into the surface layer which in the case of soda lime glass is sodium oxide. In addition, as this migration of alkali to the surface of the particles takes place in the furnace, the alkali volatilizes or sublimes into an alkali vapor since the sublimation temperature of sodium oxide is 2,330° F. After the glass particles have traversed through the furnace and when they encounter cooler temperatures, there is condensed on the outer surface of the spherical beads sodium oxide or potassium oxide, and as a result, the surface layers of the glass beads are richer in alkali than the interior thereof. This is a quite serious problem since this alkali layer is deliquescent and absorbs moisture from the air even under relatively dry conditions, which causes slushiness of the minute glass beads when stirred together and the ultimate formation of a cementitious binder with the silica similar to the reaction of water glass. When it is realized that one pound of glass beads having a particle size of 50 microns has a surface area of 1,200 square feet, it is readily understood that this surface layer is of quite appreciable magnitude. This is a serious disadvantage since this alkaline surface layer, as mentioned above, causes slushiness, agglomeration, etc., in the beads so as to prevent free flowing. Also it is injurious to most types of binders used in paints, varnishes, lacquers, enamels, and plastics in which the beads are employed so that upon drying of these vehicles the adhesion and binding of the glass beads is poor and they are more readily dislodged therefrom.

By carrying out the process of this invention, an acidic gas is caused to be contacted in the furnace with the free alkali at the high temperatures encountered so as to form an alkali metal salt of a strong acid when subsequent condensation occurs due to cooling at the finish of the process. Further, some of the acidic gas will react with alkali adjacent the surface of the molten glass whereby a low alkali and high silica glass is formed on the surface which imparts greater qualities of hardness to the beads. These salts, though they may take up a small amount of water from the moisture in the atmosphere in the form of water of hydration, do not take up such an amount as to coat the beads with any free water and, as a result, the beads have a free-flowing characteristic due to their dry surface, which is to be desired. Further, these alkali metal salts are inert with respect to silica and do not form alkali metal silicates and undesirable cementitious binders. In this process the silica does not react with the acidic gas so that as a result by forming an alkali metal salt from the free alkali upon the surface layer there is left a low percentage alkali glass relatively high in silica which renders the surface of these minute glass beads very hard and wear-resistant so that the resistance to abrasion is greatly increased. This consideration of obtaining a surface layer of low alkali and relatively high silica content is of great value in glass beads when they are used in traffic paint and the like, since in such usage they are normally subjected to a high degree of abrasion caused by traction and skidding of vehicles on the painted traffic line. Further, the hardened glass is also more resistant to weathering, oils and acids present to more or less degree on such painted traffic lines.

By a typical example of this process, ground soda lime glass having the following composition was used:

| | Percent |
|---|---|
| Silica | 71.5 |
| Sodium oxide | 15.6 |
| Lime | 10 |
| Alumina | 2.05 |

With a hundred pounds of such ground glass (12 ounces of flowers of sulphur was added and the resulting mixture, after being agitated for uniformity, was fed into a furnace maintained at a temperature of around 3,000° F. by injection with compressed air. The amount of so added sulphur may vary with beneficial results from 4 to 32 ounces and this is to some extent dependent upon the amount of alkali in the glass used. Most of the soda lime glasses used in this process without the treatment of the acidic gas will have from .2 to .7% of free alkali present on the surface and it is this alkali and some of the alkali within the glass that is rendered inactive by the present process. The reaction encountered in the example just described when sulphur burns to form sulphur dioxide can probably be best typified as follows:

Upon further oxidation the sodium sulphite, which is probably formed as an intermediate, may be oxidized to sodium sulphate, as shown below:

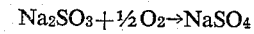

Alternatively, instead of charging sulphur with the glass stock sulphur dioxide gas may be charged directly to the bottom of the furnace through the acid gas line as provided for in the drawing.

As an example of the high proportion of free alkali that may be found on glass beads made according to the process utilizing the teaching of the Bland patent, it is found that ten grams of such beads had 24 milligrams of sodium hydroxide on their surface corresponding to 0.24%. This was determined by leaching ten grams of the beads so produced in hot distilled water at 95° C. and then titrating with one-fiftieth normal sulphuric acid using methyl red as an indicator.

It is readily apparent that in the process of this invention the neutralization of the alkali in the formation of the beads is of great advantage since no added steps are required, nor is additional tie-up of equipment, labor or time necessitated.

The efficiency of this treatment has been readily demonstrated by subjecting the beads made according to the process of this invention to a Soxhlet extraction test. The Soxhlet extraction test is based upon the percentage loss of weight in glass beads after being subjected to a continuous extraction for a period of ninety hours and then drying and weighing the same to compare with the weight of the beads before being subjected to the test. This loss of weight is indicative of the free alkali upon said beads since this free alkali when extracted with water in the test leaches out more combined alkali from within the glass to give a correspondingly greater loss in weight. It has been determined that beads which have a weight percentage loss of greater than two and a half percent are unsuitable for use in paints and the like since this high percentage of alkali will pick up moisture causing slushiness, cementation, etc., so that the beads cannot be freely dispensed and will be injurious to the binders in the paint. Beads made according to the process of the Charles Bland patent were found to have a percentage weight loss of greater than three percent up to as high as six percent, as compared with a percentage weight loss of less than two and a half percent for beads made according to the process of this invention, which clearly demonstrates the advantageous features involved in this new process.

Under certain conditions there may be a small percentage of lime formed on the surface of beads made according to the conventional prior art processes. Where this is the case, the use of the present invention acts not only to neutralize the alkali, such as sodium oxide and potassium oxide, but also the lime thereon by the reaction of the acidic gas therewith. Where the formation of lime is a consideration on the surface of the glass beads it is desirable that, of the above acidic gases mentioned, there not be used any containing the element chlorine since calcium chloride would be formed which is deliquescent and absorbs moisture from the atmosphere.

It should be understood that this invention contemplates the introduction of sulphur, ammonium salts of the strong acid gases above mentioned, and other suitable acid evolving compounds, either with the ground glass, as above described, or these compounds may be injected with air or other suitable means in appropriate form directly into the flame at which high temperatures they liberate the desired acidic gases required for the proper operation of this process. Likewise, the acidic gases themselves may be directly introduced into the furnace for the proper reaction in the production of these glass beads. The use of sulphur in this process has been described as being introduced with the ground glass since sulphur is a relatively cheap commodity and the so described manner of introduction is relatively easy and simple and readily adaptable to normal operation.

Although this invention has been particularly described with the object of incorporating the acidic gases in the production of the glass beads themselves, it should be understood that these acidic gases may be reacted with glass beads after having been produced in the manner set forth by the conventional practices in the past whereby the acidic gases react with the alkali upon the surface in the desired manner to obtain glass beads of a free-flowing characteristic and improved surface hardened qualities. Other obvious modifications of this invention will appear to those skilled in the art, and it should be understood that the scope of this invention is applicable thereto and limited only by the appended claims.

What is claimed is:

1. In a process for making small glass beads by cooling molten glass particles in the form of small glass beads, the improvement which comprises removing alkali from the surface of the beads and making said glass beads non-absorbent so as to preserve free-flowing characteristics and prevent agglomeration and cementation by contacting said molten glass particles at a high temperature with an acidic gas in a gaseous medium where said beads are suspended and agitated to present a constantly moving surface to remove free alkali present in appreciable amounts on the surface of said glass beads by converting said alkali to an alkali metal salt which is non-absorbent, said acidic gas being that corresponding to a strong acid.

2. In a process for making small glass beads substantially alkali free and silica rich at the surface and which are of free-flowing and water absorption resisting characteristics and of improved wear resisting qualities and having a particle size ranging from close to one micron to more than one thousand microns, the steps of charging raw soda lime glass stock in powdered form to a gaseous atmosphere of sufficient temperature to soften said glass stock, causing said glass stock to be dispersed into softened spherical particles by a hot turbulent gaseous force, contacting said particles of glass with an acidic fluid and cooling said particles to remove free alkali present in appreciable amounts on the surface of the glass by converting the same to an alkali salt and to form glass beads having a smooth surface of a high degree of hardness to afford free flowing characteristics when the beads are bulked together.

3. The process of claim 2 in which the acidic fluid is furnished by a solid material charged with said glass stock, said material being one which liberates an acid fluid at the temperature of said atmosphere.

4. The process of claim 3 in which said material is selected from the group consisting of sulphur, ammonium chloride, ammonium sulphate and ammonium nitrate.

5. The process of claim 2 in which said acidic fluid is selected from the group consisting of sulphuric acid, nitric acid, hydrochloric acid, chlorine, sulphur dioxide, sulphur trioxide and the oxide gases of nitrogen and wherein said acidic fluid is introduced extraneously of the glass stock.

6. A glass bead having improved surface characteristics made according to the process of claim 1.

7. A glass bead having improved surface characteristics made according to the process of claim 2.

References Cited in the file of this patent

UNITED STATES PATENTS

| | | |
|---|---|---|
| 1,782,169 | Kamita | Nov. 18, 1930 |
| 2,038,251 | Vogt | Apr. 21, 1936 |
| 2,241,511 | Greene | May 13, 1941 |
| 2,331,944 | Pazsiczky et al. | Oct. 19, 1943 |
| 2,334,578 | Potters | Nov. 16, 1943 |
| 2,461,841 | Nordberg | Feb. 15, 1949 |
| 2,500,801 | Church | Mar. 14, 1950 |
| 2,713,286 | Taylor | July 19, 1955 |